(No Model.)
C. P. STEINMETZ & E. W. RICE, Jr.
PHASE REGULATOR.
No. 596,186. Patented Dec. 28, 1897.
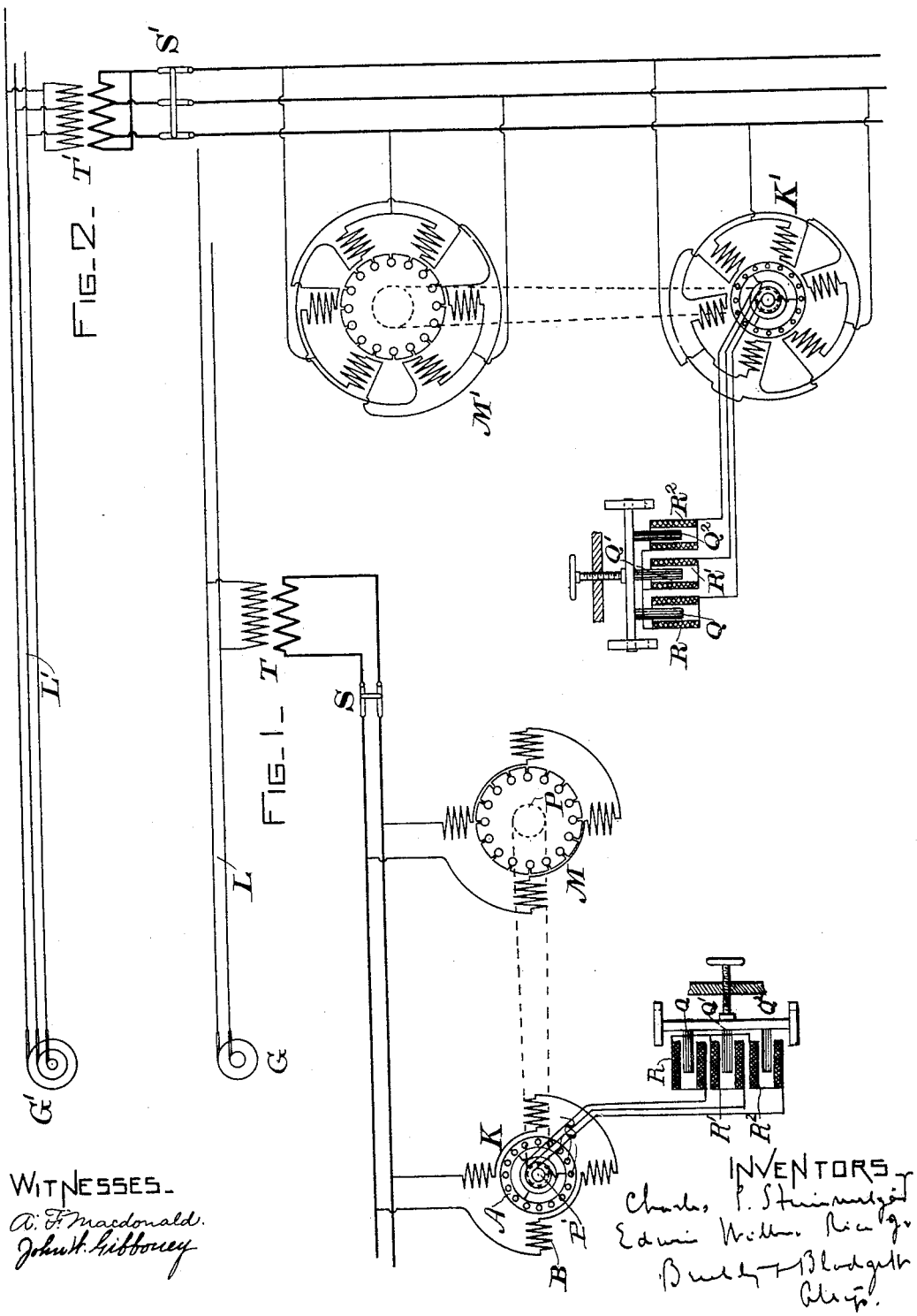
WITNESSES
A. F. Macdonald.
John H. Gibboney
INVENTORS
Charles P. Steinmetz
Edwin Wilbur Rice Jr.
Buckley & Blodgett
Attys.

UNITED STATES PATENT OFFICE.

CHARLES P. STEINMETZ, OF LYNN, AND EDWIN W. RICE, JR., OF SWAMP-SCOTT, MASSACHUSETTS, ASSIGNORS TO THE GENERAL ELECTRIC COMPANY, OF NEW YORK.

PHASE-REGULATOR.

SPECIFICATION forming part of Letters Patent No. 596,186, dated December 28, 1897.

Application filed September 9, 1893. Serial No. 485,184. (No model.)

*To all whom it may concern:*

Be it known that we, CHARLES P. STEINMETZ, of Lynn, and EDWIN W. RICE, Jr., of Swampscott, Massachusetts, citizens of the United States, now residing in Schenectady, in the county of Schenectady and State of New York, have invented certain new and useful Improvements in Phase-Regulators, of which the following is a specification.

Our present invention relates to an apparatus for compensating for the lag of current behind the electromotive force in alternating-current systems of distribution, or, more broadly stated, for controlling the phase relation between current and electromotive force in such systems. It is now well known in the art that it is frequently desirable to control the relation between current and electromotive force in alternating-current circuits. This regulation is usually made necessary by the existence of self-induction in the distribution system, which tends to lag the current behind the electromotive force, with the result of decreasing the power factor of the system in a serious and harmful degree. It has been proposed to correct this disturbance in various ways, both by the use of condensers and by the use of electrodynamic phase-controllers.

This present application is for an improvement in electrodynamic phase-controllers of the induction type, rendering them more flexible and better suited for the purpose for which they are designed.

Electrodynamic phase-controllers are superior to condensers in many respects, since a condenser must be very delicately adjusted with reference to the self-induction of the circuit and the frequency of the electromotive forces impressed thereon. Moreover, a condenser tends frequently to respond to the harmonics of the fundamental wave of electromotive force and sometimes causes very serious and harmful resonant rises of potential by reinforcing one of those harmonics. Neither can condensers be used to advance or retard the phase, as may be required, nor can they be readily adjusted to suit any change in circuit conditions. For these and other reasons it becomes necessary in most cases to resort to the use of electrodynamic phase-controllers. Such phase-controllers may be of the synchronous type or of the induction type.

Our present invention relates particularly to phase-controllers of the induction type, and has for its object to provide means by which their action may be improved and rendered more flexible and more susceptible to control.

In carrying our invention into practice we prefer to use a structure like that of an induction-motor having inducing and induced windings such as are ordinarily provided; but for the purpose of our invention it is essential that the winding ordinarily known as the "induced" winding should have a large self-induction and that the other element shall have as little self-induction as possible, or at least a self-induction far below that of the induced element. If this structure were connected in an alternating-current circuit and if the losses of friction, hysteresis, ohmic losses, &c., could be avoided, it would run up to a speed of absolute synchronism with the alternations of the main current and would have no influence upon the circuit; but if it is run below synchronism it will act as a self-inductance in the circuit retarding the current relatively to the electromotive force, and if run above synchronism it will have the reverse effect, serving as a "negative" inductance, so to speak, and may be used in substitution for a condenser connected in shunt across the mains to supply such current.

An induction-motor or phase-controller modified as above mentioned—that is, having the larger self-induction in the induced member—will supply a corrective or modifying current, as it may be regarded, of advanced phase with relation to the main current, when driven mechanically at any considerable speed above that which it would have when organized to run as an induction-motor upon the alternating circuit, or, in general, above synchronism, and when driven below such normal speed, or below synchronism, the corrective current it generates is retarded relatively to the main current. The advancing or retarding action upon the current relatively to the electromotive force thus secured can further be modified so as to correspond with the nature and amount of the load in the circuit by increasing or decreasing the self-induction of the secondary member of the phase-controller. This can readily be done by putting in circuit therewith an adjustable reactive coil.

In the drawings attached to this specification, Figure 1 is a general view of a system of distribution of the single-phase type provided with an induction phase-controller and embodying our improved adjusting device, and Fig. 2 is a view of a similar three-phase system.

G G' are sources of alternating currents of single-phase and three-phase character, respectively, which currents are fed by the lines L L' to transformers T T' and from the secondaries thereof at reduced potential to local circuits of corresponding character, in which are circuit-controlling switches S S' and also translating devices, such as induction-motors M M', adapted to the current thereon.

K K' are mechanisms, machines, or electromagnetic structures operating by electrodynamic induction serving as phase-controllers and having two magnetic elements movable with respect to each other, the one preferably having a high and the other a low self-induction. The member A is shown as the induced and movable element, and it is wound with coils on closed circuit upon a core, so as to have a high self-induction, which we find adds to the regulating effect. This may be accomplished by carrying the winding $a$ through holes in the core of laminated iron, as is shown, and by properly proportioning and designing the winding, or, if desired, by putting a self-induction coil in the circuit of this winding, while the induction-motors M and M' would be made with as little self-induction as possible in their armatures to prevent a lagging of the induced current behind its electromotive force. The primary or inducing member has its coils B connected in series in a shunt across the mains of the secondary circuit. It will be seen, then, that the structure which we have found best adapted to generate the corrective impulses to compensate for the lagging currents of the system differs from that of an induction-motor as ordinarily constructed in that the character of the induced element as regards self-induction has been changed. A convenient way of running this phase-controller K at a speed which will give the advanced or retarded wave of phase required is to belt it to another motor fed from the line, using such a size of pulley as will give it a speed greater or less than synchronism. In the drawings the pulleys P P' are shown proportioned so as to increase the speed of the controller, as the natural tendency of the current to lag in an alternating circuit more often demands in practice an advance of the current relatively to the electromotive force by the controller. Any other power able to drive the controller K at the necessary speed will of course suffice. Again, the controller K may have a greater number of poles than the machine M and be driven at the same speed, when the result will be manifestly the same. In the case of the three-phase machines M' or other plural-phase machines it is of course only necessary to wind the controller-machine correspondingly, as indicated at K', and to adjust its speed or the number of poles used, as in the case of the machine M and the controller K. When coupled in shunt to the circuit, as shown, the controller will generate current-waves which are behind or ahead of the main current-waves and are added thereto to establish the desired resultant relation. In its broadest aspects, however, the invention includes an induction-controller of the character described when coupled in series, as the modifying electromotive waves which would then be set up may accomplish the same result of controlling the phase of the current and electromotive-force waves relatively to one another.

In order to regulate the advancing or retarding action of the controller as the nature or amount of the load in the circuit is changed and the lagging or lead of the main current increases or diminishes in amount, the self-induction of the secondary member of the controller should be changed correspondingly. For this purpose there are shown both in Figs. 1 and 2 reactive coils R R' $R^2$, included, respectively, in the three branches of the three-phase winding, and corresponding movable cores Q Q' $Q^2$ are provided for varying the reactive effects of the coils as needed.

What we claim as new, and desire to secure by Letters Patent, is—

1. The method of controlling the phase relation between current and electromotive force in an alternating-current circuit, which consists in revolving a closed secondary conductor relatively to its primary conductor at a rate above or below synchronism according as an acceleration or retardation of the current relatively to the electromotive force is desired, and varying the self-induction of such secondary member to modify the accelerating or retarding influence thereby secured upon the phase relation of the main current.

2. The combination in an alternating-current circuit of an electrodynamic phase controller having inducing and induced members, means for increasing the self-induction of the induced member, and a source of power driving said controller above its normal speed.

3. The combination in an alternating-current circuit of a phase-controller composed of an inducing member connected to the circuit, and an induced member capable of relative rotation, and means for varying the self-induction of the induced member to vary the phase control.

In witness whereof we have hereunto set our hands this 31st day of August, 1893.

CHARLES P. STEINMETZ.
EDWIN W. RICE, Jr.

Witnesses:
JOHN W. GIBBONEY,
JOHN T. BRODERICK.